(12) United States Patent
Hahn et al.

(10) Patent No.: US 7,677,984 B2
(45) Date of Patent: Mar. 16, 2010

(54) PROTECTED CONNECTION INTERFACE FOR DIRECT TORQUE FLOW CONSTANT VELOCITY JOINT AND METHOD THEREOF

(75) Inventors: Steven C. Hahn, Shelby Township, MI (US); Robert Benson, Bloomfield Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 479 days.

(21) Appl. No.: 11/467,782

(22) Filed: Aug. 28, 2006

(65) Prior Publication Data
US 2008/0051204 A1    Feb. 28, 2008

(51) Int. Cl.
*F16D 1/06* (2006.01)
(52) U.S. Cl. .................. 464/182; 464/173; 464/906; 403/359.1
(58) Field of Classification Search ......... 464/144–146, 464/906, 182, 905, 173; 403/383, 359.1–359.6
See application file for complete search history.

(56) References Cited

U.S. PATENT DOCUMENTS

| | | | | |
|---|---|---|---|---|
| 3,162,026 A | * | 12/1964 | Ritsema | 464/146 |
| 3,367,139 A | * | 2/1968 | Ristau | 464/144 |
| 3,707,852 A | * | 1/1973 | Burckhardt et al. | 464/173 |
| 4,027,927 A | * | 6/1977 | Turner | 464/146 |
| 4,132,422 A | * | 1/1979 | Sankey et al. | 277/635 |
| 4,405,032 A | * | 9/1983 | Welschof et al. | 180/259 |
| 4,747,805 A | * | 5/1988 | Welschof et al. | 464/175 |
| 4,836,051 A | * | 6/1989 | Guimbretiere | 475/85 |
| 5,647,683 A | * | 7/1997 | Easley | 403/359.6 |
| 6,896,623 B2 | * | 5/2005 | Creek | 464/179 |
| 2006/0266148 A1 | * | 11/2006 | Heintschel et al. | 74/485 |

OTHER PUBLICATIONS

Permabon HH040 Anaerobic Retaining Compound. Permabond Engineering Adhesives. Aug. 4, 2006 <www.permabondllc.com/TDS/HH040Pure_TDS.pdf>.*

* cited by examiner

*Primary Examiner*—Greg Binda
(74) *Attorney, Agent, or Firm*—Jennifer M. Brumbaugh; Mick A. Nylander

(57) ABSTRACT

A direct torque flow constant velocity joint connection interface includes a drive unit, a direct torque flow constant velocity joint connector and a sealant. The drive unit includes a shaft having a second interface surface. The direct torque flow constant velocity joint connector includes a unitary inner joint part having a first interface surface, where the first interface surface is connected to the second interface surface of the drive unit. The sealant provides filling between the first and second interface surfaces. Also provided is a direct torque flow constant velocity joint connector having sealant on an interface portion of an inner joint part and a method thereof.

20 Claims, 2 Drawing Sheets

PROTECTED CONNECTION INTERFACE FOR DIRECT TORQUE FLOW CONSTANT VELOCITY JOINT AND METHOD THEREOF

TECHNICAL FIELD

The present invention relates generally to motor vehicle shaft joints, and more particularly concerns a protected connection interface for a direct torque flow constant velocity joint, including a method thereof.

BACKGROUND

Constant velocity joints (CVJ) connecting shafts to drive units are common components in automotive vehicles. The drive unit typically has an output shaft or an input shaft for receiving the joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly that is connected, for instance, at one end to an output shaft of a transmission and, at the other end, to an input shaft of a differential. The shaft is solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Connecting the shaft to a drive unit via the constant velocity joint in this manner is considered a traditional connection. The traditional connection interface is protected from external debris by a soft boot extending between the joint and the connecting shaft, thereby providing protection across the connection interface. A Direct Torque Flow (DTF) connection is a newer connection style that has advantages and improvements over a traditional connection. While the DTF connection has attendant advantages over the traditional connection, the DTF connection interface is exposed, thereby leaving the DTF connection open to external debris because the boot or shield extends between the inner and outer joint parts. Moreover, because the boot does not extend across the connection interface with a DTF connection, there is the additional potential for corrosion in the connection interface with the drive unit. One such DTF connection that may be subject to contamination by debris or exposure is the collected connection as described in PCT Application No.: PCT/US2005/036299 incorporated by reference herein. In addition to protecting against debris, it is also desirable to protect against unwanted corrosion or fretting at the connection interface.

It is desirable to have a protected connection interface for a direct torque flow constant velocity joint that overcomes the limitations indicated above.

SUMMARY OF THE INVENTION

Accordingly, the present invention provides a protected connection interface for a direct torque flow constant velocity joint. The connection interface may minimize exposure from unwanted debris. Also, the connection interface may provide protection from corrosion.

A direct torque flow constant velocity joint connection interface includes a drive unit, a direct torque flow constant velocity joint connector and a sealant. The drive unit includes a shaft having a second interface surface. The direct torque flow constant velocity joint connector includes a unitary inner joint part having a first interface surface and is coupled to the second interface surface of the drive unit. The sealant fills a portion between the first and second interface surfaces.

Also provided is a direct torque flow constant velocity joint connector having sealant on an interface portion of a unitary inner joint part, including a method thereof.

The present invention provides a protected connection interface for a direct torque flow constant velocity joint. The present invention will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

In the following description, various operating parameters and components are described for one or more constructed embodiments. These specific parameters and components are included as examples and are not meant to be limiting.

While the invention is described with respect to a protected connection interface for a direct torque flow constant velocity joint for use in a vehicle, the following apparatus is capable of being adapted for various purposes including automotive vehicle drive axles, motor systems that use a propeller shaft, or other vehicles and non-vehicle applications which require propeller shaft assemblies for torque transmission.

Figure 1:
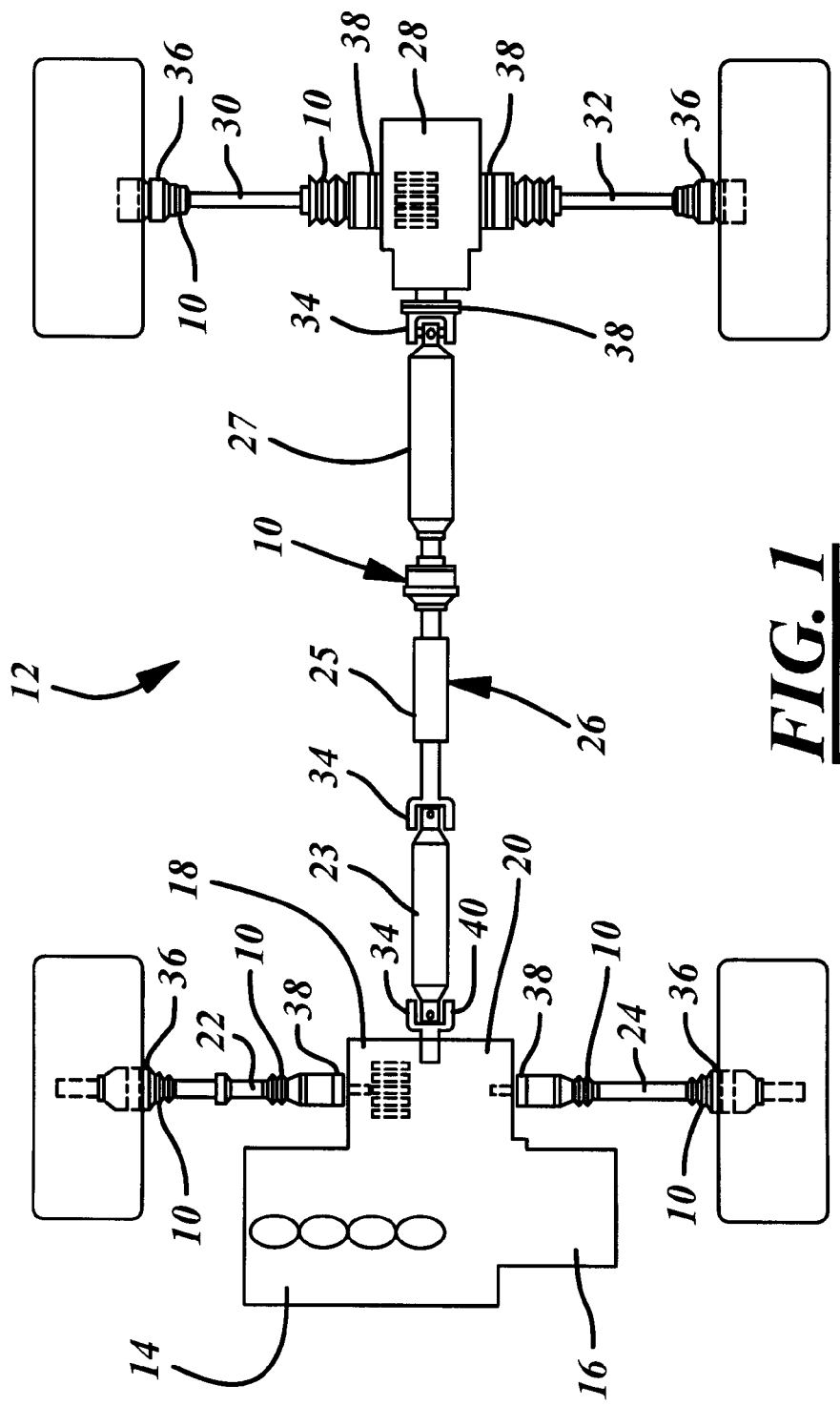
FIG. 1 shows a plan view of an exemplary drive system for a typical four-wheel drive automobile wherein the present invention may be used to advantage.

An exemplary drive system 12 for a typical four-wheel drive automobile is shown in FIG. 1. While a four-wheel drive system is shown and described, the concepts here presented could apply to a single drive unit system or multiple drive unit system, including rear wheel drive only vehicles, front wheel drive only vehicles, all wheel drive vehicles, and four-wheel drive vehicles. In this example, the drive system 12 includes an engine 14 that is connected to a transmission 16 and a power take-off unit 18. A front differential 20 has a right hand side half shaft 22 and left hand side half shaft 24, each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which include a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of Cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising, or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in everyday driving of automotive vehicles in both the half shafts, interconnecting shafts and propeller shafts of these vehicles. Optionally, each Cardan joint 34 may be replaced with any other suitable type of joint, including constant velocity joint types. A direct torque flow constant velocity joint (DTF CVJ) may be utilized for any of the above-mentioned joint locations.

The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application. Thus, any of the traditional connections identified in FIG. 1 at 10 or 34 that connect to a drive unit may be a direct torque flow constant velocity joint (DTF CVJ) utilizing a inventive protection interface in accordance with a first embodiment (FIG. 2), or a second embodiment (FIG. 3) of the present invention.

Figure 2:
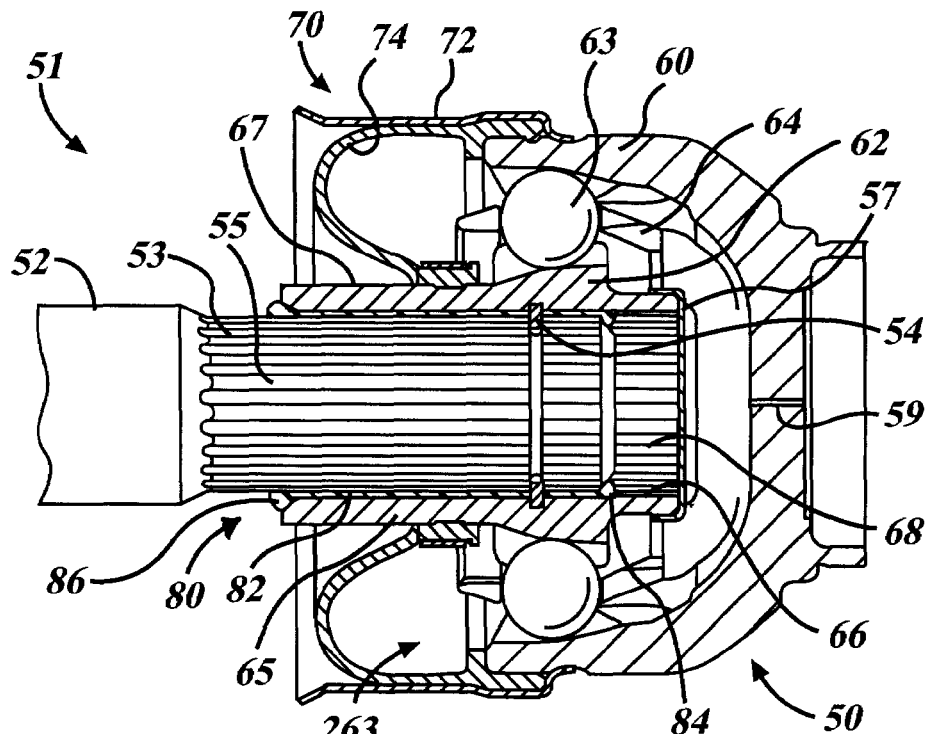
FIG. 2 shows a cross-sectional view of a first embodiment of a protected connection interface being used with a DTF CVJ connection.
Figure 3:
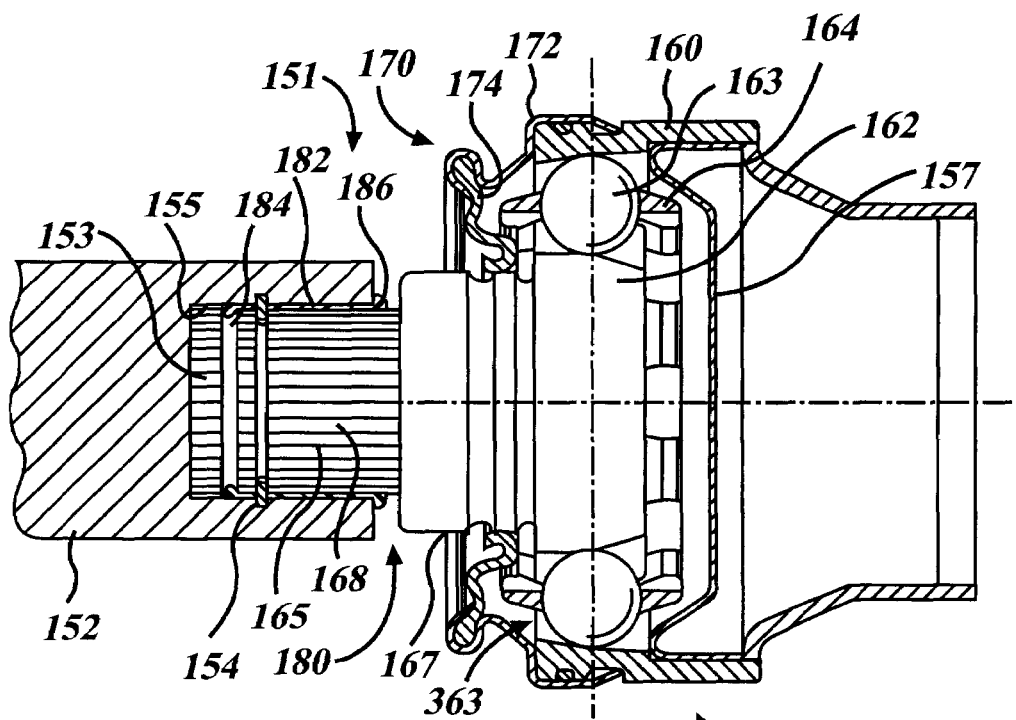
FIG. 3 shows a cross-sectional view of a second embodiment of a protected connection interface being used with a DTF CVJ connection.

For completeness of the description of the first and second embodiments of the present invention as given in FIGS. 2, and 3, respectively, the term direct torque flow (DTF) connection refers to a connection from the inner race of a constant velocity joint (CVJ) to the shaft of a differential, transmission or transfer case, generally supplied by the customer. The connection typically is in the form of a spline because of its robust design features. However, it is anticipated that other forms of connection are appropriate including fixed and releaseable connections between the inner race and the shaft. A mating key connection is just one example, without limitation, of a releaseable connector between the inner race and the shaft. Thus, a DTF connection refers to the inner race coupling to the shaft of a drive unit, such as a differential, transmission or transfer case without limitation, as opposed to the traditional connection mentioned above. The DTF connector utilizes an extension shaft on the inner joint part to provide a male connection to a drive unit, such as shown in FIG. 3. The DTF connector utilizes an internal coupler on the inner joint part to provide a female connection to a shaft of a drive unit, such as shown in FIG. 2.

Also, as used herein, a DTF connector refers to a joint coupled to a shaft, which forms a DTF shaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

FIGS. 2 and 3 will initially be described jointly below to the extent that their details generally correspond to one another. However, each of the constant velocity joints given in the various embodiments of the invention may have additional or different features recognized by a person of skill in the art. FIGS. 2 and 3 each show a DTF CVJ 50, 150, respectively, connected to a journal shaft 52, 152 of a drive unit (not shown) and axially retained by a circlip 54, 154 thereto. Generally, each DTF CVJ 50, 150 includes an outer joint part 60, 160, a unitary inner joint part 62, 162 having a boot attachment surface 67, 167, torque transmitting balls 63, 163, and a ball cage 64, 164, respectively. The balls 63, 163 are held in windows within the ball cage 64, 164 operatively engaging ball track portions 263, 363, respectively. Further, each DTF CVJ 50, 150 includes a shroud or boot assembly 70, 170 for providing a protective barrier for the internal parts and lubrication retention therein. The boot assembly 70, 170 includes a boot cover or shroud 72, 172 and an annular diaphragm or boot 74, 174 that provides a barrier between the outer joint part 60, 160 and the unitary inner joint part 62, 162, thereby substantially sealing the axially facing cavity of the outer joint part 60, 160 with the unitary inner joint part 62, 162. Also, each DTF CVJ 50, 150 may utilize a protected connection interface 80, 180, respectively, to be described below, thereby providing additional sealing and protection for the axially facing cavity. Before turning to the discussion of each inventive protected connection interface, the representative DTF CVJ 50 given in FIG. 2 is first discussed.

The outer joint part 60 generally has a circumferential-shaped or semi-spherical bore having an axially facing or inner cavity therein and an outer surface. The outer joint part 60 is generally made of a steel material, however, it should be noted that any other type of metal material, hard ceramic, plastic, or composite material, etc. may also be used for the outer joint part 60. The material is required to be able to withstand the high speeds, temperatures and contact pressures required for the DTF CVJ 50. The outer joint part 60 also includes a plurality of axially opposed outer ball tracks located on an inner surface thereof. The tracks generally form a spherical-shaped path within the inner surface of the outer joint part 60. The tracks are axially opposed such that one half of the ball tracks open to a side of the outer joint part 60 opposite to that of the other half of the ball tracks in any number of patterns. Optionally, for different types of DTF CVJs, the ball tracks all may open or axially align on the same side of the outer race. Also, the ball tracks may be of a gothic or elliptical shape provided pressure angle and conformity are maintained, or may be other shapes, as is understood by a person having skill in the art. Moreover, the ball tracks on the inner surface of the outer joint part 60 may also be double offset tracks. It should be noted that in the first embodiment as shown in FIG. 2 is a four plus four constant velocity joint, which has a total of eight balls in the DTF CVJ 50. While the DTF CVJ 50 of the first embodiment has a fixed CVJ arrangement, any DTF constant velocity joint type may be utilized. Further, it is recognized the CVJ may be a fixed or plunging CVJ, including without limitation a VL, AC, DO, or tripod joints including other fixed or plunging CVJs. However, it should be noted that it is also contemplated that a joint may be made having any number of balls incorporating all of the features of the DTF CVJ 50 according to the present invention including six, ten or more balls.

The unitary inner joint part 62 of the present embodiment generally has a circumferential shape. The unitary inner joint part 62 is arranged within an inner cavity of the outer joint part 60. The unitary inner joint part 62 includes an extension 65 and an inner bore 66 that is splined for axially retaining the DTF CVJ in a rotationally fast way to a toothed or splined portion of a shaft 52. Rotational retention of the unitary inner joint part 62 with a shaft 52 may be accomplished in other ways as would be recognized by a person of skill in the art. Axial retention of the unitary inner joint part 62 with a shaft 52 is by way of circlip 54. It is also recognized that axial retention of the unitary inner joint part 62 with a shaft 52 may also be accomplished by a compression nut, collect connector, a spring clip, or a threaded fastener just to name a few examples, without limitation. An attachment or outer surface 67 of the unitary inner joint part 62 includes a plurality of inner ball tracks that are axially opposed. The ball tracks generally have a spherical shape and are aligned with the outer ball tracks on the outer joint part 60 such that the axial angle will open in a similar or the same direction as the ball track directly aligned above it on the outer joint part 60. The inner ball tracks on the outer spherical surface of the unitary inner joint part 62 have one half of the ball tracks axially oriented in one way while the other half of the ball tracks are axially oriented in the opposite direction. The inner ball tracks will open in an alternating pattern around the outer circumference of the unitary inner joint part 62 in a matching relationship to that of the outer ball tracks of the outer joint part 60. It should be noted that in this embodiment the unitary inner joint part 62 is made of steel, however, any other metal composite, hard plastic, ceramic, etc. may also be used.

The unitary inner joint part 62 is of unitary construction, such that the ball tracks and the connection surface or splines are part of a unitary body of which the unitary inner joint part 62 may be sealed directly by a boot assembly 70 with an outer joint part 60. In this regard, the unitary inner joint part does not need an intervening stub shaft connection traditionally required in order to provide sealing by a boot assembly connected between an outer joint part and a non-unitary combined stub shaft and inner joint part.

The ball cage 64 generally has a ring-like appearance. The ball cage 64 is arranged within the bore of the outer joint part 60 such that it is not, in this embodiment, in contact with the inner surface of the outer joint part 60. The cage 64 has a plurality of oblong-shaped orifices or windows through a surface thereof. The number of windows may match the number of ball tracks on the outer joint part 60 and inner joint part 62 of the DTF CVJ 50, which is eight windows therethrough in the present embodiment of the invention. The number of balls and windows may, however, differ. The cage 64, the plurality of balls 63 and the unitary inner joint part 62 are preferably made of a steel material but any other hard metal material, plastic, composite or ceramic, etc. may also be used.

The DTF CVJ 50 includes a plurality of balls 63. The balls 63 are each arranged within a window of the cage 64 and within a ball track of the outer joint part 60 and of the unitary inner joint part 62, respectively. More than one ball may be arranged within each of the windows or there may be no balls within a window. The balls 63 roll in corresponding inner and outer ball tracks.

The DTF CVJ 50 may include a grease cap or barrier 57. The barrier 57 is generally made of a metal material, however, any plastic, rubber, ceramic or composite material may also be used. The barrier is press fit or integrally constructed between the outer joint part 60 and the propeller shaft or between the unitary inner joint part 62 and a journal shaft 52. However, any other securing method known may also be used such as fasteners, bonding, etc. The barrier 57 insures that the grease, which is used as a lubricant, will remain within the DTF CVJ 50. Optionally, a vent port 59 may be included through the outer joint part 60 or optionally through the barrier 57 to relieve any internal pressure within the CVJ 50, and the vent port 59 may include a vent valve.

While the first embodiment of the invention is described for a particular DTF CVJ having balls and sets of ball tracks for a particular type of constant velocity joint motion, it is recognized that any other suitable constant velocity balls and sets of ball tracks may be utilized with the current invention. Moreover, the DTF CVJ may also be of the fixed or plunging type of joint as is recognized within the art. Because CVJ's are well understood to a person of skill in the art, the DTF CVJ's as given in each embodiment are discussed below only to the extent necessary to further describe the invention.

FIG. 2 shows a cross-sectional view of a first embodiment of an inventive protected connection interface 80 being used to advantage with a DTF CVJ connection 51. The connection 51 includes a DTF CVJ connector 50 coupled to a shaft 52 of a drive unit. The DTF CVJ 50 includes splines 68 located on the inner bore 66 of the unitary inner joint part 62 for securing to the splines 53 located on the outer surface 55 of a shaft 52 of a drive unit. Advantageously, a sealant 82 is fully coated between the inner bore 66 of the unitary inner joint part 62 and the outer surface 55 of the shaft 52, thereby providing protection from debris and ingress of unwanted liquid such as water. As the sealant 82 is fully coated between the inner bore 66 and the outer surface 55, the sealant is coupled to an annular portion of the splines and also to an axial portion of the splines. Optionally, the sealant 82 may be partially provided upon either the unitary inner joint part 62 or the shaft 52, or upon a portion thereof, such that the sealant 82 may provide protection in a prescribed way. It is expected that the sealant may also provide a protection layer to the inner bore 66 of the unitary inner joint part 62 to mitigate unwanted material degradation such as fretting of the splines. The sealant provides the necessary protection for the connection interface 80 of the connection 51, without necessarily requiring a boot seal that encapsulates or surrounds the entire interface typically required by traditional constant velocity joints. The connection interface 80 is the interface portion where the unitary inner joint part 62 connects to a shaft 52 of a supplied drive unit and vice versa. Accordingly, the connection interface 80 is left unprotected by the boot 74, as the sealant provides protection from, merely as examples, debris and ingress of unwanted liquid such as water. For example, the boot 74 does not engage the shaft 52. Also, as shown in FIG. 2 a sealing surface of the boot 74, e.g., coinciding with a minimum diameter of the boot 74, engages a boot attachment surface of the inner joint part 62 and longitudinally overlaps the connection interface 80 relative to a longitudinal axis (not shown in FIG. 2) of the joint 51. Additionally, as shown in FIG. 2 the boot attachment surface of the inner joint part 62 is axially disposed, relative to a longitudinal axis of the joint 51, between the connection interface 80 and the outer ball tracks 263.

Prior to assembly of the connection 51, the sealant 82 is applied to the inner bore 66 of the unitary inner joint part 62 and the sealant 82 is applied to the outer surface 55 of the shaft 52. Optionally the sealant 82 may be applied to either the inner bore 66 or the outer surface 55. When the DTF CVJ 50 is assembled to the shaft 52, the excess sealant 82 applied to the inner bore 66 results as an inner sealant bulge 84. Likewise, the excess sealant 82 applied to the outer surface 55 of the shaft 52 results as an outer sealant bulge 86. The inner sealant bulge 84 and outer sealant bulge 86 are not necessary, but provide additional sealing in the connection interface 80. Optionally, the sealant 82 may be applied within a portion of each spline groove; such that the sealant 82 will be excreted upon the inner bore 66 and the outer surface 55 during assembly of the shaft 52 and the DTF CVJ 50. The sealant 82 also provides additional protection to the axially facing inner cavity of the DTF CVJ 50 from external debris while furthering retention of lubricating fluids therein.

A method of providing a protected connection interface 80 may include providing a sealant 82 upon the inner bore 66 of the unitary inner joint part 62 ready for assembly with a shaft 52. Optionally, in order to provide the DTF CVJ connector 50 with its propeller shaft (not shown) ready for assembly to a shaft 52 of a drive unit, a cover (not shown) may be provided upon the DTF CVJ 50 to keep debris away from the connection interface just before assembly.

The sealant 82 may be a resin, putty, adhesive or other compound type of sealant, such as, without limitation, epoxy, polyurethane or silicone types of sealant. Also, other suitable sealants as would be recognized by persons of skill in the art may be used to advantage.

FIG. 3 shows a cross-sectional view of a second embodiment of an inventive protected connection interface 180 being used to advantage with a DTF CVJ connection 151. The connection 151 includes a DTF CVJ connector 150 coupled to a shaft 152 of a drive unit. The unitary inner joint part 162 of the DTF CVJ 150 further includes an axial extension 165 axially extending outwardly from the unitary inner joint part 162. The DTF CVJ 150 includes splines 168 located on the outer surface 167 of the extension 165 of the unitary inner joint part 162 for securing to the splines 153 located on the inner bore 155 of a shaft 152 of a drive unit in a rotationally fast way. The splines 168 and 153 may be of any type or form and are well understood to a person of skill in the art. A sealant 182 is fully coated between the outer surface 167 of the unitary inner joint part 162 and the inner bore 155 of the shaft 152, thereby providing protection from debris and ingress of unwanted liquid such as water. Optionally, the sealant 182 may be partially provided upon either the unitary inner joint part 162 or the shaft 152, or upon a portion thereof, such that the sealant 182 may provide protection in a prescribed or desired way. It is expected that the sealant may also provide a protection layer to the outer surface 167 of the unitary inner joint part 162 to mitigate unwanted material degradation such as fretting of the splines. The sealant provides the necessary protection for the connection interface 180 of the DTF connection 151, without necessarily requiring a boot seal that encapsulates or surrounds the entire interface of a typical CVJ. The connection interface 180 is the interface portion where the unitary inner joint part 162 connects to a shaft 152 of a supplied drive unit and vice versa.

Prior to assembly of the connection 151, the sealant 182 is applied to the outer surface 167 of the unitary inner joint part 162 and sealant 182 is applied to the inner bore 155 of the shaft 152. When the DTF CVJ 150 is assembled to the shaft 152, the excess sealant 182 applied to the outer surface 167 results as an outer sealant bulge 186. Likewise, the excess sealant 182 applied to the inner bore 155 of the shaft 52 results as an inner sealant bulge 184. The inner sealant bulge 184 and outer sealant bulge 186 are not necessary, but provide additional sealing in the connection interface 180. Optionally, the sealant 182 may be applied within a portion of each spline groove, such that the sealant 182 will be excreted upon the outer surface 167 and the inner bore 155 during assembly of the shaft 152 and the DTF CVJ 150.

Optionally, the protected connection interface 180 may primarily include the sealant 182 upon the outwardly exposed portion in the form of just the outer sealant bulge 186 and may be coated inwardly therein. Various other arrangements may be accomplished.

While the material, coupling and treatment of some of the DTF CVJ parts have been discussed, appropriate selection for other parts would be well understood by a person of skill in the art.

From the foregoing, it can be seen that there has been brought to the art a new and improved protected connection interface for a direct torque flow constant velocity joint. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A protected connection interface for a direct torque flow constant velocity joint connector comprising:
    a direct torque flow connector comprising:
        an outer joint part having an inner cavity with outer ball tracks;
        a unitary inner joint part having an interface portion engageable with a second interface portion of a supplied drive unit, said unitary inner joint part having inner ball tracks coupled to said outer ball tracks in said inner cavity of said outer joint part; and
        a boot assembly coupled between said unitary inner joint part and said outer joint part providing internal sealing for said inner cavity such that said interface portion of said unitary inner joint part is unprotected by said boot assembly when said interface portion is coupled to said second interface portion; and
    a sealant coupled to said interface portion of said inner joint part, said sealant providing additional sealing when said interface portion is coupled to said second interface portion.

2. The direct torque flow constant velocity joint connector of claim 1 wherein said interface portion is an inner bore.

3. The direct torque flow constant velocity joint connector of claim 2 wherein said inner bore is splined.

4. The direct torque flow constant velocity joint connector of claim 1 wherein said interface portion is splined.

5. The direct torque flow constant velocity joint connector of claim 4 wherein said interface portion is a male spline.

6. The direct torque flow constant velocity joint connector of claim 4 wherein said sealant is coupled to an annular portion of said splines.

7. The direct torque flow constant velocity joint connector of claim 4 wherein said sealant is coupled to an axial portion of said splines.

8. A direct torque flow constant velocity joint connection interface comprising:
    a shaft having a second interface surface;
    a direct torque flow constant velocity joint connector having an outer joint part having an inner cavity with outer ball tracks, a unitary inner joint part having a first interface surface and inner ball tracks coupled with said outer ball tracks in said internal cavity, and a boot assembly coupled between said unitary inner joint part and said outer joint part and sealing said inner cavity such that said first interface surface is unprotected by said boot assembly, and wherein said second interface surface of said shaft is coupled to said first interface surface of said unitary inner joint part; and
    a sealant coupled between a portion of said first interface surface and said second interface surface.

9. The connection interface of claim 8 wherein said second interface surface is an inner bore and said first interface surface is an outer surface.

10. The connection interface of claim 9 wherein said inner bore is splined and said outer surface is splined.

11. The connection interface of claim 10 wherein said sealant is coupled to an annular portion of said splines.

12. The connection interface of claim 8 wherein said sealant fully fills the coupling between said second interface surface and said first interface surface.

13. The connection interface of claim 8 wherein said sealant includes an inner sealant bulge.

14. The connection interface of claim 8 wherein said sealant includes an outer sealant bulge.

15. The connection interface of claim 9, wherein said boot assembly does not engage said shaft.

16. A direct torque flow constant velocity joint comprising:
an outer joint part having an inner cavity with outer ball tracks;
a unitary inner joint part having an interface portion and inner ball tracks, said inner ball tracks of said unitary inner joint part coupled to said outer ball tracks in said inner cavity of said outer joint part; and
a boot assembly coupled to said outer joint part and to said unitary inner joint part, said boot assembly including a sealing surface coinciding with a minimum diameter of said boot assembly, said sealing surface engaging said unitary inner joint part; and
a sealant coupled to said interface portion of said inner joint part, said sealant providing sealing when said interface portion is coupled to a second interface portion of a supplied drive unit.

17. The constant velocity joint of claim 16, wherein said unitary inner joint part includes a boot attachment surface that engages said sealing surface of said boot assembly, said boot attachment surface arranged generally parallel to a longitudinal axis of said constant velocity joint.

18. The constant velocity joint of claim 16, where said unitary inner joint includes a boot attachment surface that engages said sealing surface of said boot assembly, said boot attachment surface axially disposed, relative to a longitudinal axis of said constant velocity joint, between said interface portion and said outer ball tracks.

19. The constant velocity joint of claim 16, wherein said sealing surface of said boot assembly longitudinally overlaps said interface portion relative to a longitudinal axis of said constant velocity joint.

20. The constant velocity joint of claim 16, wherein said interface portion includes a spline.

* * * * *